(12) United States Patent
Okada et al.

(10) Patent No.: US 8,171,918 B2
(45) Date of Patent: May 8, 2012

(54) EXHAUST GAS RECIRCULATION DEVICE OF INTERNAL COMBUSTION ENGINE

(75) Inventors: Yoshihiro Okada, Susono (JP); Shigeki Miyashita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 148 days.

(21) Appl. No.: 12/681,846

(22) PCT Filed: Mar. 26, 2009

(86) PCT No.: PCT/IB2009/005076
§ 371 (c)(1),
(2), (4) Date: Apr. 6, 2010

(87) PCT Pub. No.: WO2009/118622
PCT Pub. Date: Oct. 1, 2009

(65) Prior Publication Data
US 2010/0205941 A1    Aug. 19, 2010

(30) Foreign Application Priority Data
Mar. 27, 2008 (JP) ................. 2008-084929

(51) Int. Cl.
*F02B 47/08* (2006.01)
*F02B 47/00* (2006.01)
(52) U.S. Cl. ................. 123/568.12; 123/198 E
(58) Field of Classification Search ............ 123/568.12, 123/568.21, 568.11, 198 E; 60/605.2, 278, 60/279; 701/108
See application file for complete search history.

(56) References Cited

U.S. PATENT DOCUMENTS

| | | | |
|---|---|---|---|
| 5,785,030 A * | 7/1998 | Paas | 60/278 |
| 5,791,146 A | 8/1998 | Dungner | |
| 6,301,887 B1 | 10/2001 | Gorel et al. | |
| 6,625,978 B1 | 9/2003 | Eriksson et al. | |
| 6,981,375 B2 * | 1/2006 | Sisken et al. | 60/612 |
| 7,299,793 B1 * | 11/2007 | Tyo et al. | 123/568.12 |
| 2004/0093866 A1 | 5/2004 | Ishikawa | |
| 2006/0266018 A1 * | 11/2006 | Durand | 60/276 |
| 2009/0077968 A1 * | 3/2009 | Sun | 60/605.2 |

FOREIGN PATENT DOCUMENTS

| | | |
|---|---|---|
| EP | 1 420 159 | 5/2004 |
| JP | 6-147028 | 5/1994 |
| JP | 7-71230 | 3/1995 |
| JP | 11-125148 | 5/1999 |
| JP | 2003-97361 | 4/2003 |
| JP | 2005 264821 | 9/2005 |
| JP | 2007 23888 | 2/2007 |
| WO | 00 34630 | 6/2000 |

* cited by examiner

*Primary Examiner* — Mahmoud Gimie
(74) *Attorney, Agent, or Firm* — Oblon, Spivak, McClelland, Maier & Neustadt, L.L.P.

(57) ABSTRACT

An exhaust gas recirculation device (50) of an internal combustion engine (1) includes an EGR passage (51) linking an exhaust passage (6) and an intake passage (3) of the internal combustion engine, an EGR valve (54) that blocks the EGR passage when closed, an EGR catalyst (52) that is provided between a connection portion with the exhaust passage (6) in the EGR passage and an installation position of the EGR valve and that purifies an exhaust gas flowing in the EGR passage. The exhaust gas recirculation device performs exhaust gas recirculation control by which the EGR valve is opened and the exhaust gas flowing in the exhaust passage is recirculated to the intake passage via the EGR passage. The EGR catalyst is arranged in the vicinity of the connection portion (55) in the EGR passage.

7 Claims, 2 Drawing Sheets

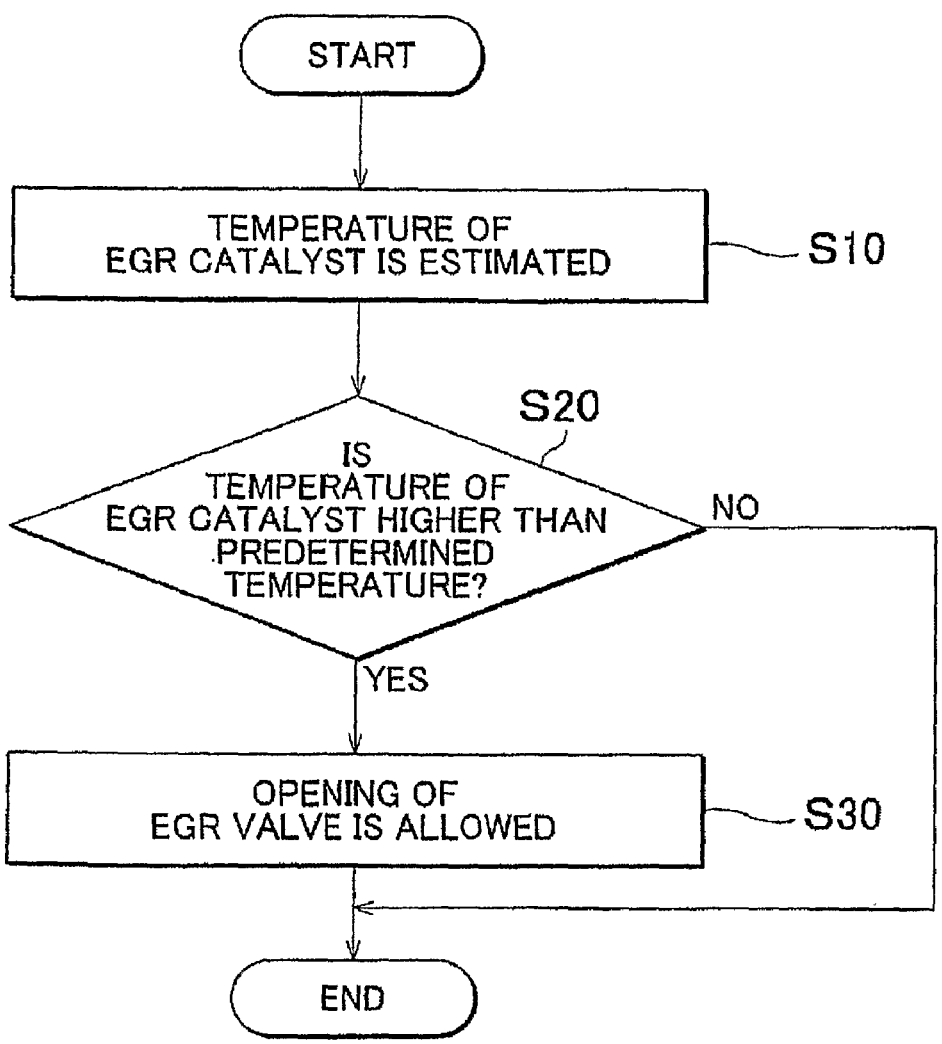

EXHAUST GAS RECIRCULATION DEVICE OF INTERNAL COMBUSTION ENGINE

BACKGROUND OF THE INVENTION

1. Field of the Invention

The invention relates to an exhaust gas recirculation device of an internal combustion engine. More particularly, the invention relates to an exhaust gas recirculation device of an internal combustion engine which includes an exhaust gas recirculation (EGR) passage that links an exhaust passage and an intake passage of the internal combustion engine, an EGR valve that blocks the EGR passage when closed, and an EGR catalyst that purifies the exhaust gas flowing in the EGR passage, and which causes the exhaust gas flowing in the exhaust passage to recirculate to the intake passage.

2. Description of the Related Art

An exhaust gas recirculation device is known in which the exhaust gas is recirculated to an intake passage via an EGR passage linking an exhaust passage and an intake passage of an internal combustion engine. The so-called external EGR by which the exhaust gas is recirculated inside cylinders of an internal combustion engine via an EGR passage can improve fuel consumption.

An EGR catalyst that purifies the exhaust gas flowing in the EGR passage and the EGR valve that regulates the amount of exhaust gas flowing in the EGR passage are sometimes provided in the EGR passage, as in an exhaust recirculation system of an internal combustion engine disclosed in Japanese Patent Application Publication No. 2005-264821 (JP-A-2005-264821), in a device that thus recirculates the exhaust gas to the intake passage via the EGR passage.

For the EGR catalyst to provide a sufficient purification function, a warm-up state has to be assumed in which the EGR catalyst temperature is equal to or higher than a predetermined temperature. Therefore, it is desirable that a decrease in temperature of the EGR catalyst during operation of an internal combustion engine be inhibited and the warm-up state of the EGR catalyst be maintained. Inhibition of temperature decrease in the EGR catalyst during operation of an internal combustion engine has not been heretofore sufficiently investigated.

For example, when an EGR valve has been provided in the EGR passage, the EGR valve is not necessarily open at all times. There is a period in which the EGR valve is closed, the EGR passage is blocked, and the exhaust gas does not flow into the EGR passage, this period being determined based on operating conditions of the internal combustion engine or the like. When the exhaust gas thus does not flow to the EGR passage, the EGR catalyst temperature may drop and purification performance may be degraded.

Accordingly, it is desirable to enable the decrease in temperature of the EGR catalyst in an exhaust gas recirculation device of an internal combustion engine including an EGR passage linking an exhaust passage and an intake passage of the internal combustion engine, an EGR valve that blocks the EGR passage when closed, and an EGR catalyst that purifies an exhaust gas flowing in the EGR passage and performing exhaust gas recirculation control by which the EGR valve is opened and the exhaust gas flowing in the exhaust passage is recirculated to the intake passage via the EGR passage.

SUMMARY OF THE INVENTION

The invention provides an exhaust gas recirculation device of an internal combustion engine, including: an EGR passage linking an exhaust passage and an intake passage of the internal combustion engine; an EGR valve that blocks the EGR passage when closed; and an EGR catalyst that purifies an exhaust gas flowing in the EGR passage, and performing exhaust gas recirculation control by which the EGR valve is opened and the exhaust gas flowing in the exhaust passage is recirculated to the intake passage via the EGR passage, wherein a decrease in temperature of the EGR catalyst can be inhibited.

The invention provides an exhaust gas recirculation device of an internal combustion engine, including: an EGR passage linking an exhaust passage and an intake passage of the internal combustion engine; an EGR valve that blocks the EGR passage when closed; and an EGR catalyst that purifies an exhaust gas flowing in the EGR passage, and performing exhaust gas recirculation control by which the EGR valve is opened and the exhaust gas flowing in the exhaust passage is recirculated to the intake passage via the EGR passage, wherein a decrease in temperature of the EGR catalyst can be inhibited even in a state in which the EGR valve is closed.

The first aspect of the invention relates to an exhaust gas recirculation device of an internal combustion engine, including: an EGR passage linking an exhaust passage of the internal combustion engine and an intake passage of the internal combustion engine; an EGR valve provided in the FOR passage and blocking the EGR passage when closed; an EGR catalyst that is provided between a connection portion with the exhaust passage in the EGR passage and an installation position of the EGR valve, purifies an exhaust gas flowing in the EGR passage, and is arranged in the vicinity of the connection portion in the FOR passage; and a control unit that performs exhaust gas recirculation control by which the EGR valve is opened and the exhaust gas flowing in the exhaust passage is recirculated to the intake passage via the EGR passage.

In the first aspect, the EGR catalyst may be provided in a position that can be reached by the exhaust gas flowing from the exhaust passage into the EGR passage due to pressure fluctuations in the exhaust gas caused by the operation of the internal combustion engine in a state in which the EGR valve is closed.

In the first aspect, the position that can be reached by the inflowing exhaust gas may be a position in which a volume of a portion between the connection portion and the EGR catalyst in the EGR passage is less than a minimum value of a volume of the exhaust gas flowing from the exhaust passage into the EGR passage due to pressure fluctuations in the exhaust gas caused by the operation of the internal combustion engine.

In the first aspect, an EGR cooling device that cools the exhaust gas flowing in the EGR passage may be provided between an installation position of the EGR valve and an installation position of the EGR catalyst in the EGR passage, and the EGR cooling device may be provided in a position in which the exhaust gas, which flows out of the EGR cooling device due to pressure fluctuations in the exhaust gas caused by the operation of the internal combustion engine in a state in which the EGR valve is closed, may be prevented from reaching the EGR catalyst.

In the first aspect, the position in which the outflowing exhaust gas can be prevented from reaching the EGR catalyst may be a position in which a volume of a portion between the EGR cooling device and the EGR catalyst in the EGR passage is greater than a maximum value of a volume of the exhaust gas flowing out from the EGR cooling device toward the EGR catalyst due to pressure fluctuations in the exhaust gas caused by the operation of the internal combustion engine.

In the first aspect, a temperature detection/estimation unit that detects or estimates a temperature of the EGR catalyst may be provided, wherein the control unit may maintain the EGR valve in a closed state as long as a temperature detected or estimated by the temperature detection/estimation unit is equal to or lower than a predetermined temperature that has been set in advance.

According to the first aspect, in an exhaust gas recirculation device of an internal combustion engine including an EGR passage linking an exhaust passage and an intake passage of the internal combustion engine, an EGR valve that blocks the EGR passage when closed, and an EGR catalyst that purifies an exhaust gas flowing in the EGR passage and performing exhaust gas recirculation control by which the EGR valve is opened and the exhaust gas flowing in the exhaust passage is recirculated to the intake passage, the EGR catalyst is provided between the connection portion with the exhaust passage and the EGR valve in the EGR passage and arranged in the vicinity of the connection portion in the EGR passage. As a result, the exhaust gas flowing in the exhaust passage easily reaches the EGR catalyst. For example, the exhaust gas flowing from the exhaust passage into the EGR passage easily reaches the EGR catalyst due to pressure fluctuations in the exhaust gas caused by the operation of the internal combustion engine. As a result, the decrease in temperature of the EGR catalyst can be inhibited by the exhaust gas heat.

BRIEF DESCRIPTION OF THE DRAWINGS

The foregoing and further objects, features and advantages of the invention will become apparent from the following description of example embodiments with reference to the accompanying drawings, wherein like numerals are used to represent like elements, and wherein:

FIG. 2 is a flowchart illustrating the operation of the embodiment of the exhaust gas recirculation device of an internal combustion engine of the invention.

DETAILED DESCRIPTION OF EMBODIMENTS

Figure 1:
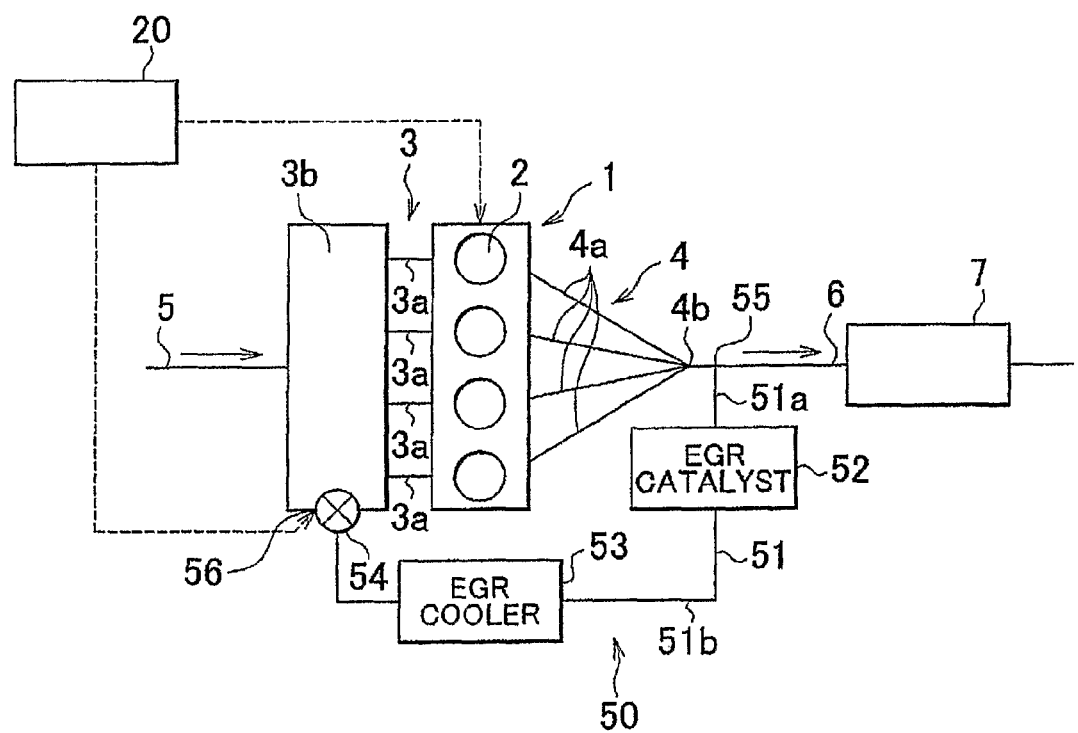
FIG. 1 is a schematic structural diagram of an embodiment of the exhaust gas recirculation device of an internal combustion engine of the invention.

An embodiment of the exhaust gas recirculation device of an, internal combustion engine of the invention will be described below with reference to the appended drawings.

(Embodiment)

An embodiment will be described below with reference to FIGS. 1 and 2. The present embodiment relates to an exhaust gas recirculation device of an internal combustion engine including an EGR passage linking an exhaust gas passage and an intake passage of the internal combustion engine, an EGR valve that shuts down the EGR passage when closed, and an EGR catalyst that purifies exhaust gas flowing in the EGR passage. The exhaust gas recalculation device causes the exhaust gas flowing in the exhaust passage to recirculate.

FIG. 1 is a schematic structural diagram of the device of the present embodiment.

FIG. 1 shows an engine 1. The engine 1 is the so-called four-cycle engine that is installed on vehicles such as passenger automobiles and trucks. In this engine, a series of four strokes: an intake stroke, a compression stroke, an expansion stroke, and an exhaust stroke are carried out as a piston (not shown in the figure) provided reciprocatingly movably in a cylinder 2 reciprocates twice. An exhaust gas recirculation device 50 of an internal combustion engine of the present embodiment is not limited to the internal combustion engine of this system and can be applied to internal combustion engines of various types. The engine 1 has four cylinders 2. An intake manifold (intake passage) 3, and an exhaust manifold (exhaust passage) 4 are connected to the engine 1.

The intake manifold 3 has four intake branch pipes 3a and a surge tank 3b. Each intake branch pipe 3a is connected to a respective different cylinder 2. The surge tank 3b is provided upstream, in the intake flow direction, of the intake branch pipes 3a in the intake manifold 3. An end portion of the intake branch pipe 3a, which is located at the upstream side, is connected to the surge tank 3b, and an end portion of the branch pipe 3a, which is located at the downstream side, is connected to the cylinder 2.

An intake pipe 5 is connected to the surge tank 3b. Air is introduced into the surge tank 3b via the intake pipe 5.

The exhaust manifold 4 is branched out into four exhaust branch pipes 4a. Each exhaust branch pipe 4a is connected to a respective different cylinder 2. The four exhaust branch pipes 4a are mutually connected in a merging portion 4b. Exhaust gas (combustion gas) generated in the cylinder 2 flows into the corresponding exhaust branch pipe 4a and merges with the exhaust gas discharged from another cylinder 2 in the merging portion 4b. An exhaust pipe (exhaust passage) 6 is connected to an end portion of the exhaust manifold 4 downstream of the merging portion 4b. An exhaust catalyst 7 that purifies the exhaust gas flowing in the exhaust pipe 6 is provided in the exhaust pipe 6.

The engine 1 of the present embodiment is provided with the exhaust gas recirculation device of an internal combustion engine (referred to hereinbelow simply as "exhaust gas recirculation device") 50 that causes the exhaust gas flowing in the exhaust passage to recirculate. The exhaust gas recirculation device 50 has an EGR passage 51, an EGR catalyst 52, an EGR cooler (EGR cooling device) 53, and an EGR valve 54.

The EGR passage 51 links the exhaust passage and the intake passage of the engine 1. More specifically, one end portion of the EGR passage 51 is connected immediately behind (downstream of the merging portion 4b and in a portion close to the merging portion 4b) the merging portion 4b in the exhaust manifold 4. A connection portion of the EGR passage 51 and the exhaust manifold 4 will be referred to hereinbelow as an exhaust-side connection portion 55. An end portion (other end portion) of the EGR passage 51 on the side opposite that connected to the exhaust manifold 4 is connected to the surge tank 3b. A connection portion of the EGR passage 51 and the surge tank 3b will be referred to hereinbelow as an intake-side connection portion 56.

The EGR catalyst 52 that purifies the exhaust gas flowing in the EOR passage 51, the EGR cooler 53 that cools the exhaust gas flowing in the EGR passage 51, and the EGR valve 54 that opens and closes the EGR passage 51 are provided in the EGR passage 51. The EGR catalyst 52 is provided in a position closer to the exhaust-side connection portion 55 than the EGR cooler 53 and EGR valve 54. The EGR cooler 53 is provided between an installation position of the EGR catalyst 52 and the installation position of the EGR valve 54 in the EGR passage 51.

Thus, when exhaust gas recirculation control is performed by which the exhaust gas is caused to recirculate in the intake passage, the exhaust gas flowing from the exhaust manifold 4 to the EGR passage 51 successively passes through the EGR catalyst 52, EGR cooler 53, and EGR valve 54 and flows into the surge tank 3b. The exhaust gas recirculating in the intake passage via the EGR passage 51 will be referred to hereinbelow as "EGR gas". The EGR gas flowing into the surge tank 3b flows into each cylinder 2 via the intake branch pipes 3a together with the air (new air) introduced into the surge tank 3b via the intake pipe 5. As a result, the so-called external EGR is realized, that is, the exhaust gas is caused to circulate inside the cylinders 2 of the engine 1 via the EGR passage 51. The external EGR makes it possible to improve fuel consumption of the engine 1.

The EGR catalyst 52 purifies unburned fuel components and particulate matter (PM) contained in the EGR gas. By installing the EGR catalyst 52 upstream of the EGR cooler 53 and the EGR valve 54, the adhesion of the unburned fuel components and the like to the EGR cooler 53, EGR valve 54, or intake system is inhibited. As a result, the formation and growth of deposits on the EGR cooler 53, EGR valve 54, and intake system can be inhibited.

The EGR cooler 53 cools the EGR gas in the EGR cooler 53 by heat exchange with cooling water. The EGR gas cooled by the EGR cooler 53 is recirculated in the cylinder 2, thereby reducing the combustion gas temperature and inhibiting the emission degradation (increase in the discharged amount of hazardous substances) of the engine 1.

The EGR valve 54 is provided in the intake-side connection portion 56. The EGR valve 54 can be adjusted to any opening degree, thereby making it possible to control the flow rate of the EGR gas flowing in the EGR passage 51. Furthermore, the EGR passage 51 can be blocked by closing the EGR valve 54.

A vehicle (not shown in the figure) carrying the engine 1 is provided with a control unit 20 having an electronic control unit (ECU) that controls various components of the vehicle. The EGR valve 54 is connected to the control unit 20 and controlled by the control unit 20. The control unit 20 has a function of controlling the opening-closing state of the EGR valve 54. The engine 1 is connected to the control unit 20, and the operation of the engine 1 such as a fuel injection amount and injection timing is controlled by the control unit 20. The control unit 20 of the present embodiment has a function of a temperature detection/estimation unit that detects or estimates the temperature of the EGR catalyst 52.

The control unit 20 executes exhaust gas recirculation control by which the EGR valve 54 is opened and the exhaust gas flowing in the exhaust passage is recirculated to the intake passage via the EGR passage 51. The control unit 20 determines whether the EGR gas is introduced into the cylinder 2 (whether the exhaust gas recirculation control is executed) on the basis of operating conditions of the engine 1, for example, engine speed and load of the engine 1. Furthermore, when the EGR gas is determined to be introduced into the cylinder 2, the control unit 20 computes a target value of the EGR ratio, which is a ratio of the EGR gas in the intake air introduced into the cylinder 2. The control unit 20 executes the opening-closing control of the EGR valve 54 so as to realize the target EGR ratio.

Under certain operating conditions of the engine 1, the exhaust gas recirculation control is not performed, that is, the exhaust gas is not recirculated to the intake passage. When the exhaust gas recirculation control is determined not to be performed on the basis of operating conditions of the engine 1, the control unit 20 closes the EGR valve 54 and blocks the EGR passage 51.

The EGR catalyst 52 cannot completely purify the exhaust gas under low-temperature conditions. Therefore, it is desirable that the decrease in temperature of the EGR catalyst 52 be inhibited and a state be assumed (warm-up state) in which the EGR catalyst 52 has sufficient purification performance when the engine 1 operates. However, when the EGR valve 54 is closed, as described hereinabove, the EGR gas does not flow into the EGR catalyst 52. Therefore, it is possible that the temperature of the EGR catalyst 52 will decrease and the purification performance of the EGR catalyst 52 will degrade.

By contrast, in the exhaust gas recirculation device 50 of the present embodiment, the EGR catalyst 52 is provided in the vicinity of the exhaust-side connection portion 55. Thus, the EGR catalyst 52 is provided in the vicinity of the connection portion with the exhaust manifold 4 (exhaust passage) in the EGR passage 51. As a result, the exhaust gas flowing in the exhaust manifold 4 flows into the EGR passage 51 and easily reaches the EGR catalyst 52. For example, as will be described below, the exhaust gas flowing into the EGR passage 51 due to exhaust gas pulsations easily reaches the EGR catalyst 52.

During operation of the engine 1, exhaust pulsations are generated in the exhaust passage due to a repetition of a series of four strokes (intake stroke, compression stroke, expansion stroke, and exhaust stroke) in each cylinder 2. Because of these exhaust gas pulsations, the exhaust gas flows into the FOR passage 51 even when the EGR valve 54 is closed. In other words, when the pressure inside the exhaust manifold 4 becomes higher than that inside the FOR passage 51 due to pressure fluctuations in the exhaust gas flowing in the exhaust manifold 4 as the engine 1 operates, the exhaust gas flows from the exhaust manifold 4 into the EGR passage 51. Where the pressure inside the exhaust manifold 4 becomes lower than that inside the EGR passage 51, the exhaust gas flows out from the EGR passage 51 into the exhaust manifold 4. Thus, due to exhaust gas pulsations, the exhaust gas flows from the exhaust manifold 4 into the EGR passage 51 and into the opposite direction, that is, exhaust gas "breathing" occurs.

In the present embodiment, the EGR catalyst 52 is provided in the vicinity of the exhaust-side connection portion 55. Therefore, the exhaust gas flowing to the EGR passage 51 easily reaches the EGR catalyst 52 due to a difference between a pressure inside the exhaust manifold 4 and a pressure inside the EGR passage 51. As a result, the decrease in temperature of the EGR catalyst 52 can be inhibited.

Furthermore, because the EGR catalyst 52 is provided in the vicinity of the exhaust-side connection portion 55, the decrease in temperature of the EGR catalyst 52 is inhibited by thermal conduction of the EGR passage 51. The heat of the exhaust gas flowing in the exhaust manifold 4 is transmitted to the EGR catalyst 52 via a wall portion of the exhaust manifold 4 and a wall portion of the EGR passage 51. Because the EGR catalyst 52 is provided in the vicinity of exhaust-side connection portion 55, the EGR catalyst 52 can obtain a larger amount of heat due to thermal conduction. As a result, with the exhaust gas recirculation device 50 of the present embodiment, the decrease in temperature of the EGR catalyst 52 can be inhibited.

In the present embodiment, the position of the EGR catalyst 52 is so set as to enable more reliable inhibition of temperature decrease in the EGR catalyst 52. The EGR catalyst 52 is arranged in a position in which the exhaust gas flowing to the EGR passage 51 due to exhaust gas pulsations can reach the EGR catalyst 52, regardless of operating conditions of the engine 1. Because the position that can be reached by the exhaust gas differs depending on operating conditions of the engine 1, the installation position of the EGR catalyst 52 is determined according to operating conditions under which the reachable position is the closest to the exhaust-side connection portion 55 (it is most difficult for the exhaust gas to reach the EGR catalyst 52).

The installation position of the EGR catalyst 52 can be found, for example, by an appropriate test. The engine 1 is operated under various operating conditions and the installation position of the EGR catalyst 52 is determined so that the exhaust gas can reach the EGR catalyst 52 even in the case of operating conditions under which the position that can be reached by the exhaust gas flowing from the exhaust manifold 4 into the EGR passage 51 is the closest to the exhaust-side connection portion 55. For example, a volume of the exhaust gas flowing from the exhaust manifold 4 to the EGR passage 51 due to exhaust gas pulsations is measured under various operating conditions and a minimum value of the volume of the exhaust gas flowing from the exhaust manifold 4 to the EGR passage 51 is found. The installation position of the EGR catalyst 52 is then determined so that the volume of the portion (see reference numeral 51a) between the exhaust-side connection portion 55 and the EGR catalyst 52 in the EGR passage 51 is equal to or less than the minimum value of the volume.

The installation position of the EGR catalyst 52 may be also determined based on a length of the portion 51a between the exhaust-side connection portion 55 and the EGR catalyst 52, rather than on the volume of the portion 51a between the exhaust-side connection portion 55 and the EGR catalyst 52. In this case, a reaching distance of the exhaust gas flowing from the exhaust manifold 4 to the EGR passage 51 due to exhaust gas pulsations (distance between the exhaust-side connection portion 55 and a point that has been reached by the exhaust gas that flowed into the EGR passage 51 and is the closest to the intake-side connection portion 56) is measured under various operating conditions, and a minimum value of the reaching distance is found. The installation position of the EGR catalyst 52 is then determined so that a length (distance) of the portion 51a between the exhaust-side connection portion 55 and the EGR catalyst 52 in the EGR passage 51 is equal to or less than the reaching distance.

Because the EGR catalyst 52 is thus installed, the exhaust gas flowing from the exhaust manifold 4 to the EGR passage 51 due to exhaust gas pulsations can be reliably caused to reach the EGR catalyst 52 even when the EGR valve 54 is closed. From the standpoint of inhibiting the temperature decrease in the EGR catalyst 52, it is desirable that the EGR catalyst 52 be as close to the exhaust-side connection portion 55 as possible. For, example, the length of the portion 51a between the exhaust-side connection portion 55 and the EGR catalyst 52 in the EGR passage 51 can be made substantially zero.

Furthermore, in the exhaust gas recirculation device 50 of the present embodiment, the mutual arrangement of the EGR catalyst 52 and the EGR cooler 53 is determined so that the low-temperature exhaust gas located in the EGR cooler 53 does not flow back to the EGR catalyst 52 and does not cause temperature decrease in the EGR catalyst 52.

More specifically, the length (or volume) of a portion 51b between the EGR catalyst 52 and the EGR cooler 53 in the EGR passage 51 is set so that the exhaust gas that has flown out from the EGR cooler 53 due to exhaust fluctuations is prevented from reaching the EGR catalyst 52. As described hereinabove, pressure fluctuations in the exhaust gas flowing in the exhaust manifold 4 occur as the engine 1 operates. As a result, the exhaust gas flows from the exhaust manifold 4 to the EGR passage 51, or the exhaust gas flows out of the EGR passage 51 to the exhaust manifold 4. Thus, the exhaust gas moves inside the EGR passage 51 even when the EGR valve 54 is closed. In this case, where the low-temperature exhaust gas located inside the EGR cooler 53, that is, the exhaust gas cooled by the EGR cooler 53, reaches the EGR catalyst 52, the temperature of the EGR catalyst 52 decreases.

In the present embodiment, as described hereinafter, the EGR cooler 53 is disposed so that the exhaust gas flowing out of the EGR cooler 53 is prevented from reaching the EGR catalyst 52 even when the exhaust gas moves inside the EGR passage 51 due to exhaust fluctuations.

The installation position of the EGR cooler 53 (position relative to the EGR catalyst 52) can be found, for example, by an appropriate test. The engine 1 is operated under various operating conditions and the EGR cooler 53 is installed so that the exhaust as flowing out of the EGR cooler 53 can be prevented from reaching the EGR catalyst 52 even under operating conditions are such that the outflowing exhaust gas moves to a location closest to the exhaust gas connection portion 55 (the largest degree of movement). For example, the outflow amount (breathing amount caused by exhaust gas pulsations) of the exhaust gas flowing out of the EGR cooler 53 toward the EGR catalyst 52 due to exhaust gas pulsations is measured under various operating conditions of the engine 1, and a mutual arrangement of the EGR cooler 53 and the EGR catalyst 52 is determined such that the volume of the portion 51b between the EGR catalyst 52 and the EGR cooler 53 in the EGR passage 51 becomes larger than the maximum value of the measured outflow amount.

The mutual arrangement of the EGR cooler 53 and the EGR catalyst 52 may be also determined based on the length of the portion 51b between the EGR catalyst 52 and the EGR cooler 53, rather than on the volume of the portion 51b between the EGR catalyst 52 and the EGR cooler 53 in the EGR passage 51. In this case, the movement amount (movement distance) of the exhaust gas flowing out of the EGR cooler 53 toward the EGR catalyst 52 due to exhaust gas pulsations is measured under various operating conditions and a maximum value of the movement amount is found. A mutual arrangement of the EGR cooler 53 and the EGR catalyst 52 is then determined such that the length (distance) of the portion 51b between the EGR catalyst 52 and the EGR cooler 53 in the EGR passage 51 becomes larger than the maximum value of the movement amount.

When the mutual arrangement of the EGR cooler 53 and the EGR catalyst 52 is thus determined, the low-temperature exhaust gas flowing out of the EGR cooler 53 is prevented from reaching the EGR catalyst 52 and the temperature of the EGR catalyst 52 is prevented from decreasing even when the exhaust gas moves inside the EGR passage 51 due to exhaust gas pulsations in a state in which the EGR valve 54 is closed.

For example, under high-load operating conditions or operating conditions increasing filling efficiency of air inside the cylinders, it is necessary to raise the output torque as much as possible. Therefore, the EGR valve 54 is sometimes closed to increase the ratio of air (new air) in the intake. Under such operating conditions, the amount of exhaust gas discharged from the engine 1 is large and the exhaust gas pressure rises (pressure fluctuations are large). Therefore, when the EGR valve 54 is closed under high-load operating conditions or operating conditions increasing the filling efficiency of air inside the cylinders, it can be assumed that the movement range of the exhaust gas inside the EGR passage 51 will increase and the exhaust gas flowing out of the EGR cooler 53 will easily reach the EGR catalyst 52. In the exhaust gas recirculation device 50 of the present embodiment, the low-temperature exhaust gas flowing out of the EGR cooler 53 can be prevented from reaching the EGR catalyst 52 and the temperature of the EGR catalyst 52 can be prevented from decreasing even in such a case.

In the exhaust gas recirculation device 50 of the present embodiment, the exhaust gas connection portion 55 is provided immediately after the merging portion 4b of the exhaust manifold 4. As a result, as will be described hereinbelow, it is possible to demonstrate an effect of inhibiting the decrease in temperature of the EGR catalyst 52, while inhibiting the decrease in purification efficiency of the EGR catalyst 52.

Further, in the present embodiment, the control unit 20 executes air-fuel ratio control such that the air-fuel ratio of the exhaust gas flowing into the exhaust catalyst 7 becomes the stoichiometric air-fuel ratio. Thus, injection control of the fuel supplied into each cylinder 2 is so performed that the air-fuel ratio of the exhaust gas becomes the stoichiometric air-fuel ratio when the exhaust gases discharged from the cylinders 2 merge and flow into the exhaust catalyst. When the air-fuel ratio of the exhaust gas after merging in the merging portion 4b is thus controlled to the stoichiometric air-fuel ratio, the air-fuel ratio of the exhaust gas discharged from each cylinder 2 (air-fuel ratio of the exhaust gas flowing in the exhaust branch pipe 4a) is not necessarily the stoichiometric air-fuel ratio. The air-fuel ratio varies among the cylinders 2 and the air-fuel ratio of the exhaust gas discharged from each cylinder 2 can be rich or lean in relation to the stoichiometric air-fuel ratio. From the standpoint of preventing the exhaust gas having a higher temperature from being introduced in the EGR catalyst 52 and inhibiting the decrease in temperature of the EGR catalyst 52, it is desirable that the exhaust gas connection portion 55 be provided upstream of the merging portion 4b. However, when the EGR passage 51 is connected upstream of the merging portion 4b, the air-fuel ratio of the exhaust gas flowing into the EGR passage 51 can become rich or lean in relation to the stoichiometric air-fuel ratio and it is possible that the EGR catalyst 52 will not provide sufficient purification performance.

By contrast, in the present embodiment, the EGR passage 51 is connected to the merging portion 4b of the exhaust manifold 4 or immediately after the merging portion 4b. As a result, the exhaust gas with a stoichiometric air-fuel ratio in which the air-fuel ratio is averaged flows into the EGR passage 51, the decrease in purification efficiency of the EGR catalyst 52 is inhibited, and the EGR catalyst 52 can efficiently purify the exhaust gas. Furthermore, because the EGR passage 51 is connected downstream of the merging portion 4b and as far on the upstream side as possible, the exhaust gas with a higher temperature can be guided to the EGR passage 51.

Furthermore, because rich or lean exhaust gases discharged from each cylinder 2 are merged in the merging portion 4b, a reaction heat is generated by unburned components of fuel mainly contained in the rich exhaust gas and oxygen mainly contained in the lean exhaust gas downstream of the merging portion 4b. Because the exhaust gas downstream of the merging portion 4b in the exhaust manifold 4 reaches the EGR catalyst 52, for example, oxygen adsorbed by the EGR catalyst 52 when the lean exhaust gas has reached the catalyst reacts with the unburned components contained in the rich exhaust gas that has reached the catalyst, thereby making it possible to heat the EGR catalyst 52. As a result, temperature decrease in the EGR catalyst 52 is inhibited.

In particular, in the present embodiment, the EGR catalyst 52 is provided in a position that can be reached by the exhaust gas flowing from the exhaust manifold 4 to the EGR passage 51 due to exhaust gas pulsations even in a state in which the EGR valve 54 is closed. As a result, not only the EGR catalyst 52 is heated by the exhaust gas heat, but also the EGR catalyst 52 is heated by the reaction heat of oxygen and unburned components of fuel even when the EGR valve 54 is closed.

As described hereinabove, with the exhaust gas recirculation device 50 of the present embodiment, because the EGR catalyst 52 is provided in the vicinity of the exhaust gas connection portion 55, the exhaust gas flowing from the exhaust manifold 4 to the EGR passage 51 can easily reach the EGR catalyst 52 and temperature decrease in the EGR catalyst 52 is inhibited. In particular, because the EGR catalyst 52 is installed so that the exhaust gas flowing into the EGR passage 51 due to exhaust gas pulsations can reach the EGR catalyst 52, temperature decrease in the EGR catalyst 52 can be inhibited more reliably.

Furthermore, in the exhaust gas recirculation device 50 of the present embodiment, the mutual arrangement of the EGR catalyst 52 and the EGR cooler 53 is determined such that the low-temperature exhaust gas located in the EGR cooler 53 does not flow back to the EGR catalyst 52 and does not cause temperature decrease in the EGR catalyst 52. The length (volume) of the EGR passage 51 between the EGR catalyst 52 and the EGR cooler 53 is made large so that the exhaust gas that has flown out from the EGR cooler 53 can be prevented from reaching the EGR catalyst 52 even when the exhaust gas located inside the EGR passage 51 moves due to pressure fluctuations in the exhaust gas accompanying the operation of the engine 1. Therefore, in a state in which the EGR valve 54 is closed, the exhaust gas flowing from the EGR cooler 53 is prevented from coming into contact with and decreasing the temperature of the EGR catalyst 52.

The opening-closing control of the EGR valve 54 performed by the control unit 20 when cooling is started will be explained below.

In the present embodiment, when the EGR catalyst 52 is not sufficiently warmed up, for example, when cooling is started, the control unit 20 maintains the EGR valve 54 in a closed state till the EGR catalyst 52 reaches a predetermined warm-up state. As a result, accumulation of deposits on the intake system induced by a flow of exhaust gas in the EGR passage 51 before the EGR catalyst 52 is warmed up can be inhibited.

In the conventional exhaust gas recirculation device, the temperature of the EGR catalyst 52 cannot be expected to rise when the EGR valve 54 is closed and the exhaust gas does not flow in the EGR passage 51. Therefore, it is necessary to open the EGR valve 54 and cause the exhaust gas to flow in the EGR passage 51 in order to warm up the EGR catalyst 52. In this case, because the exhaust gas flows before the EGR catalyst 52 reaches a predetermined warm-up state, unburned components of fuel or PM are not sufficiently removed, pass through the EGR catalyst 52, and can adhere to the intake system. When unburned components adhere to the intake system, deposits can be produced in the intake system.

By contrast, in the exhaust gas recirculation device 50 of the present embodiment, the high-temperature exhaust gas can reach the EGR catalyst 52 due to exhaust gas pulsations even when the EGR valve 54 remains closed. Therefore, where the engine 1 operates, the EGR catalyst 52 is warmed up even if the EGR valve 54 remains closed. As a result, the EGR valve 54 can be opened and the flow of exhaust gas to the EGR passage 51 can be started after the temperature of the EGR catalyst 52 has raised sufficiently (for example, to a temperature equal to or higher than an activation temperature). The exhaust gas can be prevented from flowing in the EGR passage 51, while the EGR catalyst 52 is not sufficiently warmed up, and the formation and growth of deposits in the intake system can be inhibited.

Whether the EGR catalyst 52 has reached a predetermined warm-up state is determined by estimating the warm-up state of the EGR catalyst 52 on the basis of the history of operating conditions. The control unit 20 estimates the warm-up state of the EGR catalyst 52 from the amount of heat provided by the exhaust gas to the EGR catalyst 52 and a heat capacity of the EGR catalyst 52. The amount of heat provided by the exhaust gas to the EGR catalyst 52 can be found, for example, from the exhaust gas temperature determined by the operating conditions of the engine 1 and the volume (flow rate) of exhaust gas reaching the EGR catalyst 52 due to exhaust gas pulsations. The control unit 20 stores in advance a map showing a relationship between operating conditions of the engine 1 and a variation amount of temperature of the EGR catalyst 52 per a predetermined interval corresponding to the operating conditions. The control unit 20 estimates the variation amount of temperature of the EGR catalyst 52 with reference to the map on the basis of the operation conditions of the engine 1 with a predetermined interval that has been set in advance, integrates the estimated variation amount of temperature, and estimates the present temperature (warm-up state) of the EGR catalyst 52. For example, an engine speed and output torque (engine load) of the engine 1 can be used as the operating conditions of the engine 1.

FIG. 2 is a flowchart illustrating the operations performed when the control unit 20 determines whether the EGR valve 54 is opened after the cooling has been started. The flowchart shown in FIG. 2 is repeatedly executed, for example, after the cooling has been started when it has not been determined that the EGR valve 54 is opened (when it has not been determined that the EGR catalyst 52 reached the predetermined warm-up state).

First, in step S10, the present temperature of the EGR catalyst 52 is estimated by the control unit 20. The control unit 20 estimates a variation amount of temperature of the EGR catalyst 52 in a predetermined interval that was determined in advance on the basis of operating conditions of the engine 1 and estimates the present temperature of the EGR catalyst 52 by integrating the estimated variation amount of temperature.

Then, in step S20, the control unit 20 determines whether the present temperature of the EGR catalyst 52 estimated in step S10 is higher than the predetermined temperature that has been set in advance. The predetermined temperature is a threshold for determining whether the EGR catalyst 52 has reached a predetermined warm-up state and can sufficiently purify the exhaust gas. The predetermined temperature is set based, for example, on the activation temperature of the EGR catalyst 52. When the determination result of step S20 indicates that the present temperature of the EGR catalyst 52 is higher than the predetermined temperature (step S20—Yes), the control flow advances to step S30, and when the present temperature of the catalyst is not higher than the predetermined temperature (step S20—No), the control flow ends.

In step S30, the control unit 20 allows the EGR valve 54 to be opened. As a result, it is determined that the preparation for executing the exhaust gas recirculation control by which the exhaust gas is recirculated to the intake passage has been completed. When it is determined on the basis of operating conditions of the engine 1 that the exhaust gas recirculation control is to be executed, the control unit 20 allows the exhaust gas recirculation control to be executed. Where step S30 is executed, the control flow ends.

The EGR valve 54 is not allowed to be opened as long as a negative determination is made is step S20. In this case, the control unit 20 does not allow the exhaust gas recirculation control to be executed even when it has been determined that the exhaust gas recirculation control is to be executed on the basis of operation conditions of the engine 1.

As described hereinabove, the exhaust gas is prevented from flowing in the EGR passage 51 before the EGR catalyst 52 is in the warm-up state by determining whether the EGR valve 54 is allowed to be open on the basis of the estimated temperature of the EGR catalyst 52. Furthermore, the high-temperature exhaust gas can be caused to reach the EGR catalyst 52 and the EGR catalyst 52 can be warmed up due to the exhaust gas breathing effect induced by exhaust gas pulsations.

The invention claimed is:

1. An exhaust gas recirculation device of an internal combustion engine, comprising:
    an EGR passage linking an exhaust passage of the internal combustion engine and an intake passage of the internal combustion engine;
    an EGR valve provided in the EGR passage and blocking the EGR passage when closed;
    an EGR catalyst that is provided between a connection portion with the exhaust passage in the EGR passage and an installation position of the EGR valve, purifies an exhaust gas flowing in the EGR passage, and is arranged in the vicinity of the connection portion in the EGR passage;
    an EGR cooling device that is provided between the installation position of the EGR valve and an installation position of the EGR catalyst in the EGR passage and cools the exhaust gas flowing in the EGR passage; and
    a control unit that performs exhaust gas recirculation control by which the EGR valve is opened and the exhaust gas flowing in the exhaust passage is recirculated to the intake passage via the EGR passage,
    wherein the EGR catalyst is provided in a position that can be reached by the exhaust gas flowing from the exhaust passage into the EGR passage due to pressure fluctuations in the exhaust gas caused by operation of the internal combustion engine in a state in which the EGR valve is closed,
    wherein the position that can be reached by the inflowing exhaust gas is a position such that a volume of a portion between the connection portion and the EGR catalyst in the EGR passage, in the state in which the EGR valve is closed, is less than a minimum value of a volume of the exhaust gas flowing from the exhaust passage into the EGR passage due to pressure fluctuations in the exhaust gas caused by the operation of the internal combustion engine, and
    wherein the EGR cooling device is provided in a position such that the exhaust gas, which flows out of the EGR cooling device due to pressure fluctuations in the exhaust gas caused by the operation of the internal combustion engine in a state in which the EGR valve is closed, is prevented from reaching the EGR catalyst.

2. The exhaust gas recirculation device according to claim 1, wherein the position that can be reached by the inflowing exhaust gas is a position in which a length of a portion between the connection portion and the EGR catalyst in the EGR passage is less than a minimum value of a reaching distance of the exhaust gas flowing from the exhaust passage into the EGR passage due to pressure fluctuations in the exhaust gas caused by the operation of the internal combustion engine.

3. The exhaust gas recirculation device according to claim 1, wherein the length of a portion between the connection portion and the EGR catalyst in the EGR passage is substantially zero.

4. The exhaust gas recirculation device according to claim 1, wherein the position in which the outflowing exhaust gas can be prevented from reaching the EGR catalyst is a position in which a volume of a portion between the EGR cooling device and the EGR catalyst in the EGR passage is greater than a maximum value of a volume of the exhaust gas flowing out from the EGR cooling device toward the EGR catalyst due to pressure fluctuations in the exhaust gas caused by the operation of the internal combustion engine.

5. The exhaust gas recirculation device according to claim 1, wherein the position in which the outflowing exhaust gas can be prevented from reaching the EGR catalyst is a position in which a length of a portion between the EGR cooling device and the EGR catalyst in the EGR passage is greater than a maximum value of a movement distance of the exhaust gas flowing out from the EGR cooling device toward the EGR catalyst due to pressure fluctuations in the exhaust gas caused by the operation of the internal combustion engine.

6. The exhaust gas recirculation device according to claim 1, further comprising a temperature detection/estimation unit that detects or estimates a temperature of the EGR catalyst, wherein the control unit maintains the EGR valve in a closed state as long as a temperature detected or estimated by the temperature detection/estimation unit is equal to or lower than a predetermined temperature that has been set in advance.

7. The exhaust gas recirculation device according to claim 1, wherein the installation position of the EGR valve is a connection portion of an end of the EGR passage and a surge tank of the intake passage of the internal combustion engine, the surge tank is disposed upstream of a cylinder of the internal combustion engine and connected to the cylinder via an intake branch pipe.

* * * * *